United States Patent
Wu et al.

(10) Patent No.: US 6,643,329 B1
(45) Date of Patent: *Nov. 4, 2003

(54) METHOD AND APPARATUS FOR DYNAMIC PIPELINING

(75) Inventors: Qiong Wu, Los Gatos, CA (US); Kwok K. Chau, Los Altos, CA (US); Toshiaki Yoshino, Fremont, CA (US)

(73) Assignee: NJR Corporation, Mountain View, CA (US)

(*) Notice: Subject to any disclaimer, the term of this patent is extended or adjusted under 35 U.S.C. 154(b) by 534 days.

This patent is subject to a terminal disclaimer.

(21) Appl. No.: 09/636,390

(22) Filed: Aug. 9, 2000

Related U.S. Application Data

(63) Continuation-in-part of application No. 09/494,105, filed on Jan. 28, 2000, now Pat. No. 6,459,738.

(51) Int. Cl.[7] .................................................. H04N 7/12
(52) U.S. Cl. ................................................. 375/240.25
(58) Field of Search ..................... 375/240.23, 240.24, 375/240.25, 240.26, 240.27; 348/425.1, 425.2; 341/67; 710/260–264; 712/219–220, 210, 225, 244; 714/798–799

(56) References Cited

U.S. PATENT DOCUMENTS

| | | | |
|---|---|---|---|
| 5,566,192 A | * 10/1996 | Moon | 714/798 |
| 5,579,525 A | * 11/1996 | Suzuki | 710/260 |
| 5,598,483 A | 1/1997 | Purcell et al. | |
| 5,625,355 A | * 4/1997 | Takeno et al. | 341/67 |
| 5,767,799 A | * 6/1998 | Maertens et al. | 341/67 |
| 5,812,791 A | * 9/1998 | Wasserman et al. | 709/247 |
| 5,818,532 A | 10/1998 | Malladi et al. | |
| 5,818,539 A | * 10/1998 | Naimpally et al. | 348/512 |
| 5,907,374 A | * 5/1999 | Liu | 375/240.26 |
| 6,011,868 A | * 1/2000 | van den Branden et al. | 382/233 |
| 6,212,236 B1 | * 4/2001 | Nishida et al. | 375/240.12 |
| 6,330,365 B1 | * 12/2001 | Yasuda et al. | 382/233 |
| 6,459,738 B1 | * 10/2002 | Wu et al. | 375/240.27 |

FOREIGN PATENT DOCUMENTS

EP 0674446 A 9/1995

OTHER PUBLICATIONS

Chang et al., "Optimal Nonlinear Adaptive Prediction and Modeling of MPEG Video in ATM Networks Using Pipelined Recurren Neural Networks", IEEE Journal on Selected Areas in Communications, vol. 15, iss. 6, pp. 1087–1100, Aug. 1997.*

(List continued on next page.)

*Primary Examiner*—Vu Le
(74) *Attorney, Agent, or Firm*—Perkins Coie LLP

(57) ABSTRACT

A decoder is disclosed that provides dynamic pipelining of an incoming compressed bitstream. The decoder includes decoding logic modules capable of decoding an incoming compressed bitstream, and memory storing logic in communication with at least one of the decoding modules. Preferably, the memory storing logic is capable of determining whether a memory operation is complete that stores the uncompressed video data to memory. In addition, the decoder includes halting logic in communication with the decoding logic and the memory storing logic. The halting logic halts the decoding of the incoming bitstream during a specific time period, which includes a time period wherein the memory operation is incomplete. Finally, initiating logic is included in the decoder that is in communication with the decoding logic and the memory storing logic. The initiating logic of the decoder restarts the decoding when the memory operation is complete.

20 Claims, 8 Drawing Sheets

OTHER PUBLICATIONS

Komori, S., et al, "An Elastic Pipeline Mechanism by Self–Timed Circuits", *IEEE Journal of Solid–State Circuits*, U.S. IEEE, Inc., vol. 23, No. 1, pp. 111–117 (1988).

Onoye, T., et al., "HDTV Level MPEG2 Video Decoder VLSI", *IEEE Region Ten Conference on Microelectronics and VLSI* (Tencon), U.S. New York, pp. 468–471 (1995).

Ling, N., et al., "An Efficient Controller Scheme for MPEG–2 Video Decoder", *IEEE transactions on Consumer Electronics*, IEEE, Inc., New York, vol. 44, No. 2, pp. 451–458 (1998).

\* cited by examiner

METHOD AND APPARATUS FOR DYNAMIC PIPELINING

CROSS REFERENCE TO RELATED APPLICATIONS

This application is a continuation-in-part of U.S. patent application Ser. No. 09/494,105 filed on Jan. 28, 2000 U.S. Pat. No. 6,459,738, which is incorporated herein by reference in its entirety.

FIELD OF INVENTION

The present invention relates to compressed bitstream decoding. More specifically, the present invention relates to methods and apparatuses for the dynamic decoding of high bandwidth bitstreams at high decoding speeds.

BACKGROUND OF THE INVENTION

Because of the advantages digital video has to offer, in the past few decades analog video technology has evolved into digital video technology. For example, digital video can be stored and distributed more cheaply than analogy video because digital video can be stored on randomly accessible media such as magnetic disc drives (hard disks) and optical disc media known as compact (CDs). In addition, once stored on a randomly accessible medium, digital video may be interactive, allowing it to be used in games, catalogs, training, education, and other applications.

One of the newest products to be based on digital video technology is the digital video disc, sometimes called "digital versatile disc" or simply "DVD." These discs are the size of an audio CD, yet hold up to 17 billion bytes of data, 26 times the data on an audio CD. Moreover, DVD storage capacity (17 Gbytes) is much higher than CD-ROM (600 Mbytes) and can be delivered at a higher rate than CD-ROM. Therefore, DVD technology represents a tremendous improvement in video and audio quality over traditional systems such as televisions, VCRs and CD-ROM.

DVDs generally contain video data in compressed MPEG format. To decompress the video and audio signals, DVD players use decoding hardware to decode the incoming bitstream. FIG. 1 is a block diagram showing a prior art digital video system 100. The digital video system 100 includes a digital source 102, a digital processor 104, and a digital output 106. The digital source 104 includes DVD drives and other digital source providers, such as an Internet streaming video connection. The digital processor 104 is typically an application specific integrated circuit (ASIC), while the digital output 106 generally includes display devices such as television sets and monitors, and also audio devices such as speakers.

Referring next to prior art FIG. 2, a conventional digital processor 104 is shown. The digital processor 104 includes a decompression engine 200, a controller 202, and DRAM 204. Essentially, the bitstream is decompressed by the decompression engine 200, which utilizes the DRAM 204 and the controller 202 during the decompression process. The decompressed data is then sent to a display controller 206, which displays decompressed images on a display device, such as a television or monitor.

As stated previously, digital processors are generally embodied on ASICs. These ASICs typically map key functional operations such as variable length decoding (VLD), run-length decoding (RLD), Zig Zag Scan, inverse quantization (IQ), inverse discrete cosine transformation (IDCT), motion compensation (MC), and merge and store (MS) to dedicated hardware. To gain processing speeds, techniques such as pipeline implementation of these modules are used to execute computations with available cycle time.

Generally, an MPEG bitstream is provided to a DRAM i/f by a memory controller and thereafter made available to the VLD, RLD/IZZ, IQ, and IDCT for data reconstruction. Simultaneously, the MC executes if motion compensation exist for the current data. When the MC and IDCT finished their operations, the output data from each module is added together by the MS module, the result being the reconstructed data. Finally, the MS stores the reconstructed data in DRAM.

Unlike the execution times of the VLD, RLD/IZZ, IQ, and IDCT modules, which are fixed, the execution time of the MS module is variable. Hence, to avoid memory access conflicts, the MS module in a conventional decompression engine must wait for the IDCT and MC modules to finish processing for the current macroblock. Thereafter, the other modules in the decompression engine must wait for the MS to finish processing in order to ensure that the IDCT memory is free. Only after the MS is finished processing is the next macroblock begun.

FIG. 3 is an implementation timing diagram 300 illustrating module execution timing for a conventional decompress engine. The implementation timing diagram 300 includes a VLD/IQ/IZZ operational period 302a, an IDCT operational period 304a, an IDCT memory store operational period 306a, and an MS operational period 308a.

In operation, the VLD/IQ/IZZ 302a modules are started, at time to. After certain cycles the VLD/IQ/IZZ 302a generates a data block and stores it in a double buffer. Then, at time t1 the IDCT 304a reads the data block from the double buffer and generates a data block which is stored in the IDCT memory buffer 306a, at time t2. Then, at time t3, after all the IDCT data has been written to the IDCT memory buffer 306a, the MS 308a begins reading the IDCT memory buffer. During this time the MS 308 reads both the IDCT and MC data, adds them together, and stores the result the DRAM. Finally, after the MS 308a is finished reading all the data and storing it in the DRAM, the process is started again, at the next macroblock M2.

The critical issue is the relationship between the IDCT and the MS. The IDCT uses a coded block pattern (CBP) for memory storage. Thus, the configuration of the data in memory is unknown until the bitstream is decoded. The MS, on the other hand, reads relative data sequentially. Hence, conflicts may occur if the MS and IDCT share the IDCT memory at the same time, since the IDCT may over write data that the MS is attempting to read.

To avoid these conflicts, conventional decoders delay the start of the next VLD/IQ/IZZ 302b operational period until after the MS operational period 308a is completed. In this manner, a buffer of time $\Delta t$ is created between the time the MS 308a is finished reading the IDCT memory, and the time the IDCT writes to the IDCT memory 306a. This buffer ensures no memory conflicts will occur in the IDCT memory during a conventional decoding process. Thus, if t0 to t1 is one block time latency and t1 to t2 is one block time latency, then $\Delta t$ ($\Delta t = t2 - t0$) is a two block latency.

However, the time used to create the buffer $\Delta t$ is wasted since the MS and IDCT memory are idle during this period. Ideally, the IDCT memory would be active during this time receiving data from the IDCT. However, since the MS must access the DRAM, the MS operational period 308a is uncertain, as shown in FIG. 3 with reference to MS operational period 308a, and MS operational period 308b. Thus, prior art decompression engines generally must use a time buffer Δt to avoid memory conflicts between the IDCT and MS.

In view of the foregoing, what is needed are improved methods and apparatuses for decoding an incoming bitstream that increase bandwidth of the system. The system should be robust and capable of operating without read/write time buffers that reduce bandwidth.

SUMMARY OF THE INVENTION

The present invention addresses these needs by providing a method for halting the decoding process during potential memory access conflicts between the IDCT and the MS. First, a portion of an incoming bitstream is decoded. During this operation uncompressed video data is generated by various decoding modules. Then, a determination is made as to whether a memory operation is complete that stores the uncompressed video data to memory. The decoding of the incoming bitstream is halted during a specific time period, which includes a time period wherein the memory operation is incomplete. Finally, the decoding of the incoming bitstream is restarted when the memory operation is complete.

In another embodiment a decoder is disclosed that provides dynamic pipelining of an incoming compressed bitstream. The decoder includes decoding logic modules capable of decoding an incoming compressed bitstream, and memory storing logic in communication with at least one of the decoding modules. Preferably, the memory storing logic is capable of determining whether a memory operation is complete that stores the uncompressed video data to memory. In addition, the decoder includes halting logic in communication with the decoding logic and the memory storing logic. The halting logic halts the decoding of the incoming bitstream during a specific time period, which includes a time period wherein the memory operation is incomplete. Finally, initiating logic is included in the decoder that is in communication with the decoding logic and the memory storing logic. The initiating logic of the decoder restarts the decoding when the memory operation is complete.

In a further embodiment, an application specific integrated circuit (ASIC) that includes a decoder that provides dynamic pipelining of an incoming compressed bitstream is disclosed. The ASIC includes a memory controller, decoding logic modules that are capable of decoding an incoming compressed bitstream, and memory storing logic in communication with at least one of the decoding modules, capable of determining whether a memory operation is complete. Preferably, the memory operation includes storing the uncompressed video data to memory. In addition, halting logic is included in the ASIC. The halting logic is generally in communication with the decoding logic and the memory storing logic, and is capable of halting the decoding of the incoming bitstream during a specific time period, which includes a time period wherein the memory operation is incomplete. Finally, the ASIC includes initiating logic in communication with the decoding logic and the memory storing logic, that is capable of restarting the decoding of the incoming bitstream when the memory operation is complete.

Advantageously, the present invention allows for greater efficiency in decoding by providing a mechanism that allows for synchronization of memory writes by different decoding modules. By halting decoding and memory write operations when write operation conflicts occur, the present invention avoids the need of large buffers of time, used conventionally to prevent memory write conflicts.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

An invention is described for decoding an incoming bitstream while avoiding artifacts when the bitstream flow is interrupted. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
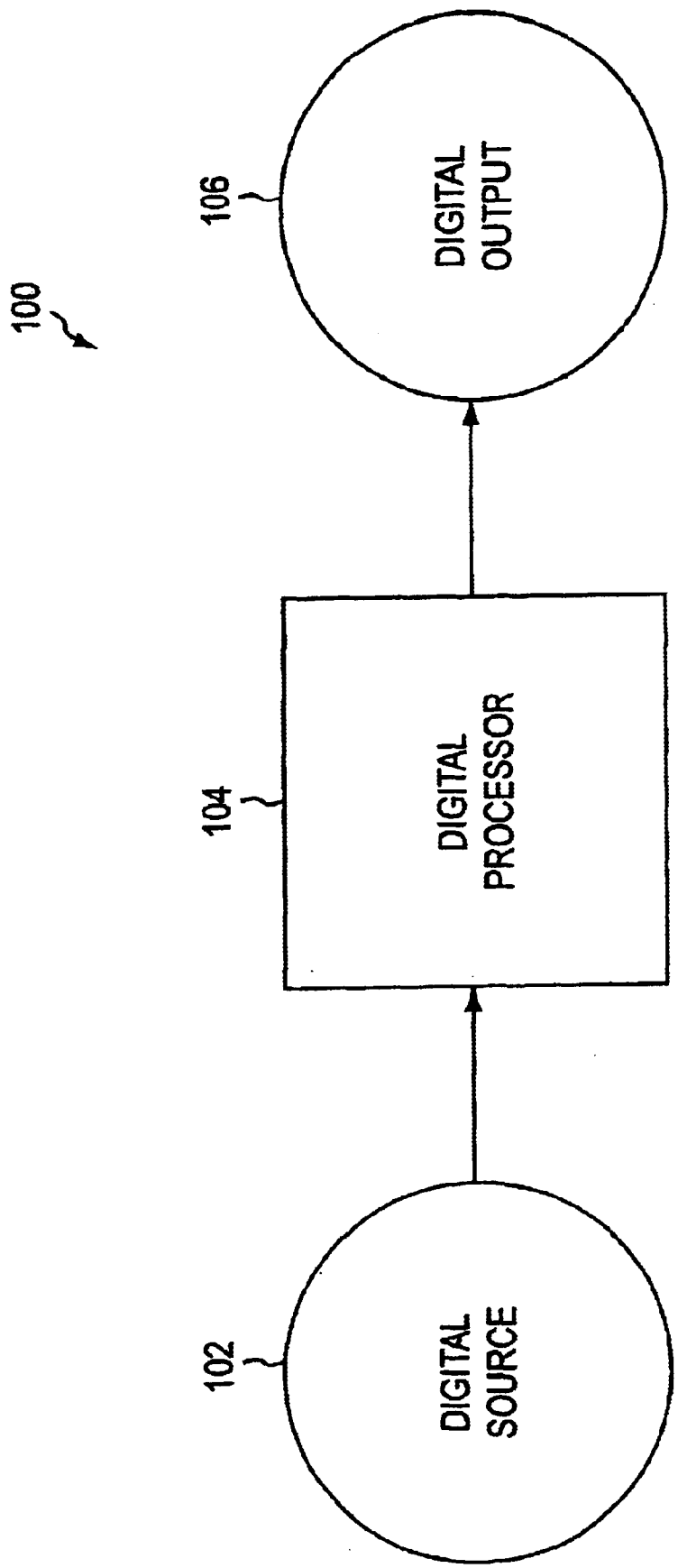
FIG. 1 is a block diagram showing a prior art conventional digital video system.
Figure 2:
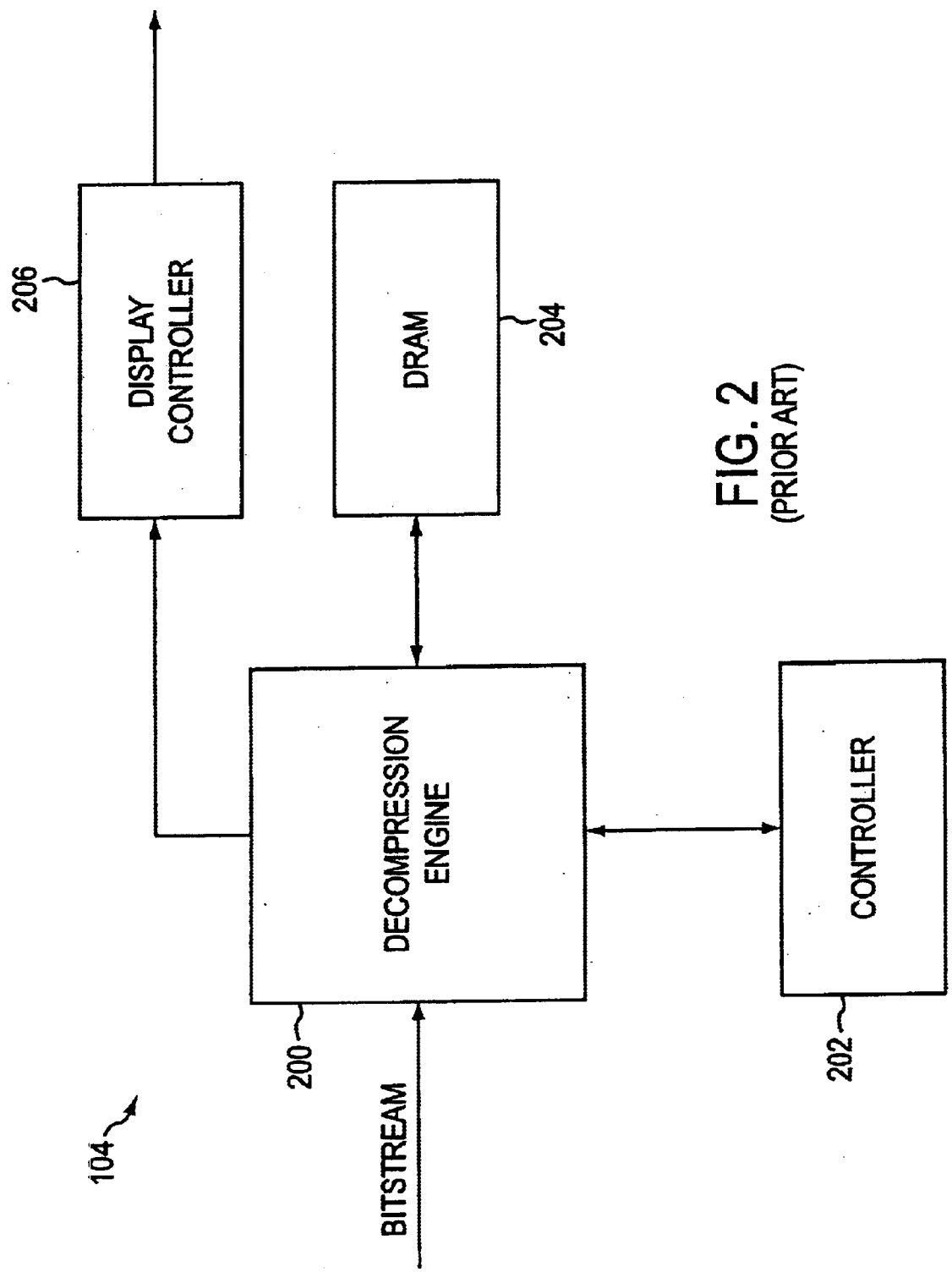
FIG. 2 is block diagram showing a prior art conventional digital processor.
Figure 3:
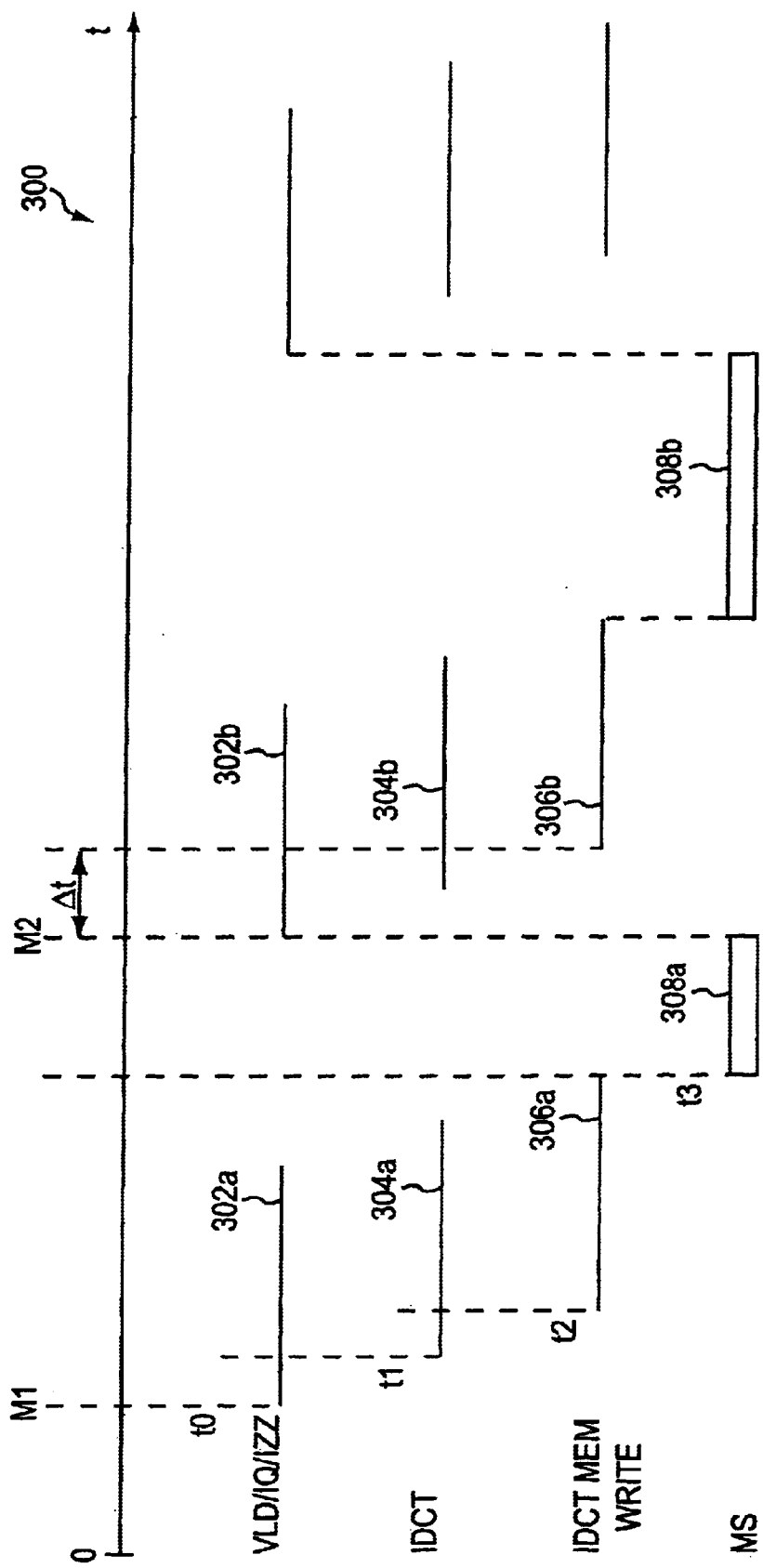
FIG. 3 is a prior art implementation timing diagram illustrating module execution timing for a conventional decompress engine.
Figure 4:
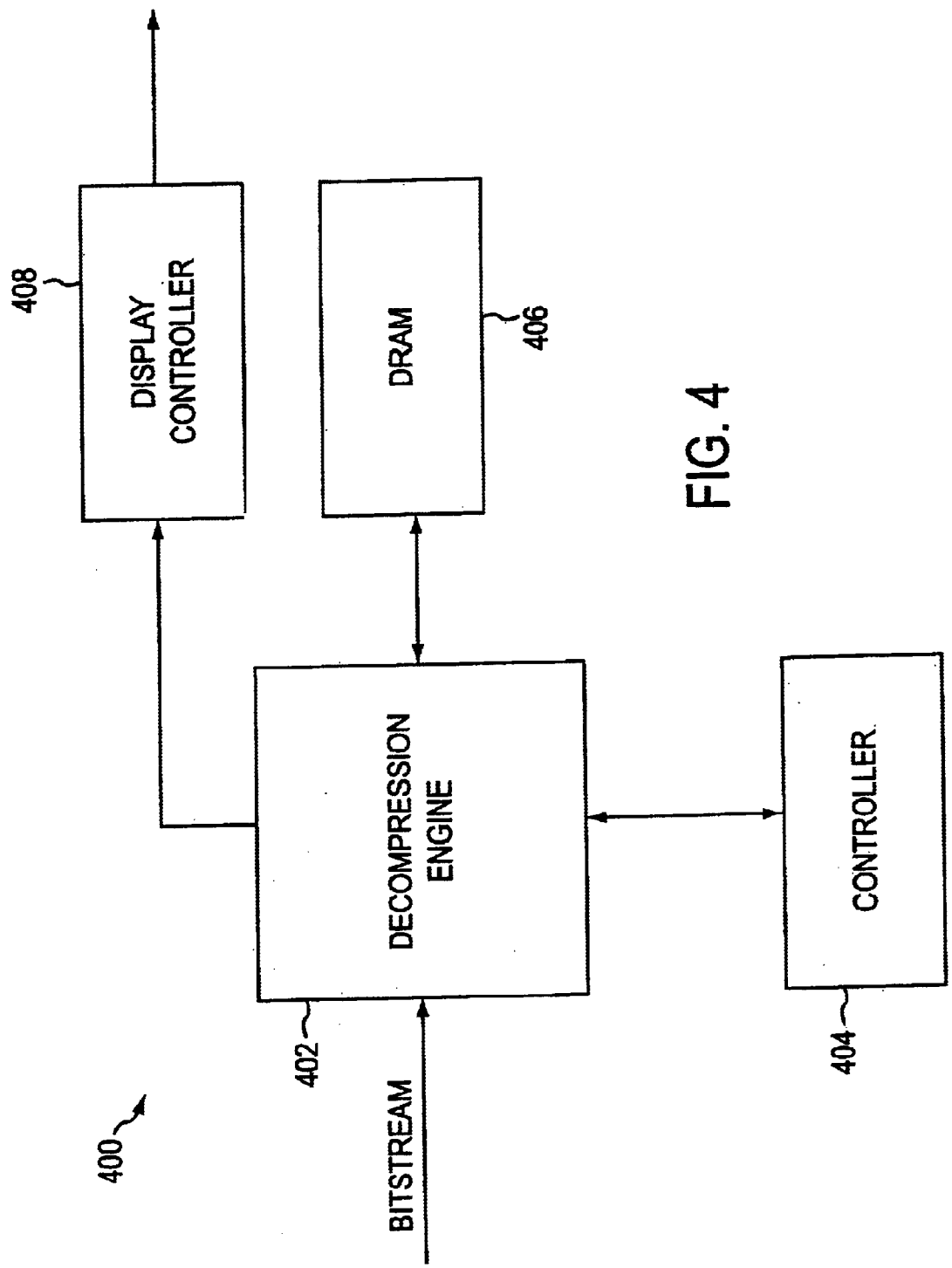
FIG. 4 is a block diagram of a digital processor, in accordance with one embodiment of the present invention.

FIGS. 1, 2, and 3 were described in terms of the prior art. FIG. 4 is a block diagram of a digital processor 400, in accordance with one embodiment of the present invention. The digital processor 400 includes a decompression engine 402, a controller 404, and DRAM 406. In use, the decompression engine 402 receives an incoming bitstream and then decodes that bitstream utilizing the controller 404 and the DRAM 406. The decompressed data is then sent to a display controller 408, which displays the decompressed image data on a display device, such as a television or computer monitor.

Figure 5:
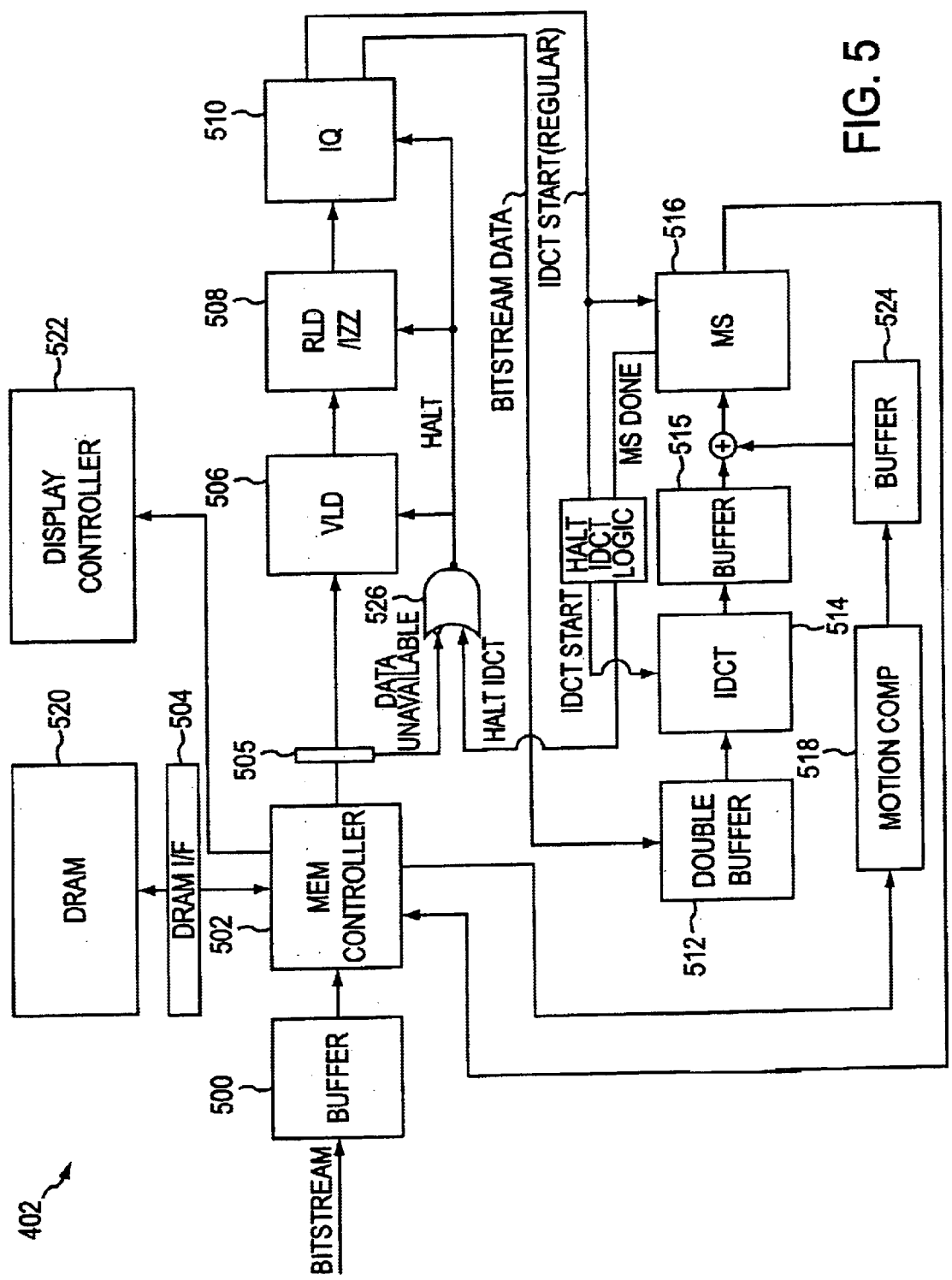
FIG. 5 is schematic diagram showing a decompression engine in accordance with an embodiment of the present invention is shown.

Referring next to FIG. 5, a decompression engine 402 in accordance with an embodiment of the present invention is shown. The decompression engine 402 includes a memory controller buffer 500, a memory controller 502, a DRAM I/F 504, a FIFO controller 505, a VLD 506, a RLD/IZZ 508, and a IQ 510, an IDCT input double buffer 512, an IDCT 514, an IDCT memory buffer 515, a merge and store (MS) 516, a motion compensation 518, a DRAM 520, a display controller 522, a motion compensation memory buffer 524, and a halt AND gate 526.

During operation, bitstream data is received by the memory controller buffer 500. The memory controller 502 then stores the data in DRAM 520 after parsing the data using a parser (not shown). Later, after the data is decoded, the decoded data is again stored in the DRAM 520 by the memory controller 502. Finally, when the data is ready to be viewed, the memory controller 502 obtains the decoded data from the DRAM 520 and sends it to a display controller 522, which displays the decompressed image data on a display device, such as a television or computer monitor.

Generally, an MPEG bitstream is provided to the DRAM I/F 504 by the memory controller 502 and then made available to the VLD 506, RLD/IZZ 508, IQ 510, and IDCT 514 to reconstruct the data. Simultaneously, the motion compensation 518 executes if motion compensation exist for the current data. The VLD 506, RLD/IZZ 508, IQ 510, and IDCT 514 each have a fixed execution time. However, there is a two block latency time from the VLD 506 to the IDCT output memory 515. When the motion compensation 518 and IDCT 514 complete their operations, the output data from each module is stored in either the IDCT memory buffer 515, for the IDCT 514 output data, or the motion compensation memory buffer 524, for the motion compensation 518 output data. The MS 516 thereafter reads the data from both the IDCT memory buffer 515 and the motion compensation memory buffer 524 and adds them together to become the reconstructed data. The MS 516 then stores the reconstructed data in DRAM 520, using the memory controller 502.

It is important to note that with the IDCT input double buffer 512, the VLD 506, the RLD/IZZ 508, and the IQ 510 alternately write one data block to one buffer of the double buffer 512 when finishing the processing of one block. They then send an IDCT start signal to the IDCT 514. This ensures that the IDCT 514 has a whole data block to process. Advantageously, the above described design makes the present invention's implementation relatively simple and cost effective.

In addition, the present invention avoids artifact creation by halting the pipeline execution when data is unavailable for decoding. The availability of the bitstream data utilizes the FIFO controller 505. The FIFO controller 505 sends a data valid TRUE signal to the VLD 506, RLD/IZZ 508, and IQ 510 modules via a NAND gate 526 when bitstream data is available for decoding. When bitstream data is unavailable for decoding the FIFO controller 505 sends a data valid FALSE signal to the modules. The data valid FALSE signal then makes each module "freeze." Thus, all decoding operations are halted when data becomes unavailable for decoding. Details of artifact avoidance via halting pipeline execution can be found in co-pending U.S. patent application Ser. No. 09/494,105, incorporated herein by reference in its entirety.

Further, the present invention provides dynamic pipelining by controlling the flow of data based on the performance of the MS module 516. As described previously, generally the MS module 516 is finished reading data from the IDCT memory buffer 515 before the IDCT module 514 is ready to write to the IDCT memory buffer 515. However, if the MS module 516 is delayed, for example when the DRAM 520 is busy servicing other modules, the IDCT module 514 may be ready to write to the IDCT memory buffer 515 before the MS module 516 is finished reading from the IDCT memory buffer 515. In this case, the present invention halts the pipeline to allow the MS module to finishing reading data from the IDCT memory buffer 515.

It is important to note that HALT IDCT 514 and IDCT memory 515 vary in cycle base and are very expensive since IDCT 515 contains many registers. However, delaying the IDCT start signal received by IDCT 514 is relatively simple. As mentioned previously, there is a one block latency in time between each of VLD 506, RLD/IZZ 508, and IQ 510 to IDCT 514 and from IDCT 514 to IDCT buffer 515. Therefore, delaying the writing of the first block of IDCT data to the IDCT buffer 515 is equivalent to delaying the start of the second block of the IDCT process in IDCT 514.

To avoid IDCT memory buffer 515 conflicts, the present invention creates a small logic 528 that detects a second block IDCT START (REGULA) signal. If the signal is true, then the small logic 528 also checks the state of MS Module 516. If the MS module 516 is finished reading the IDCT memory buffer 515, the MS module 516 transmits a MS_done TRUE flag to HALT IDCT LOGIC 528. HALT IDCT LOGIC 528 will then transmit an IDCT START flag TRUE signal to IDCT module 514 and a HALT IDCT flag FALSE signal to GATE 526. However, if the MS module 516 is not finished reading the IDCT memory buffer 515, the MS module transmits an MS_done FALSE flag to HALT IDCT LOGIC 528. HALT IDCT LOGIC 528 will continue to transmit an IDCT START flag FALSE signal until it receives an MS_done flag TRUE signal. This will stop processing of the second block in IDCT module 514 and correspondingly prevent data from being written to IDCT memory buffer 515. Meanwhile, upon the HALT IDCT flag registering as TRUE to GATE 526, it will "freeze" VLD506, RLD/IZZ 508 and IQ510, thus halting of module operation.

As shown in FIG. 5, the HALT IDCT LOGIC 528 sends a HALT IDCT flag to the OR gate 526. The OR gate 526 also receives a data unvalid flag from the FIFO controller 505. The OR gate 526 performs a OR operation with the two flags resulting in a halt signal, which is provided to the VLD 506, RLD/IZZ 508, and the IQ 510. When either the bitstream data is unavailable for decoding or when HALT IDCT flag TRUE indicating the MS module 516 is reading data from the IDCT memory buffer (and thus the MS_done flag is FALSE), the halt TRUE signal makes each module "freeze." Thus, all decoding operations are halted when data becomes unavailable for decoding.

Figure 6:
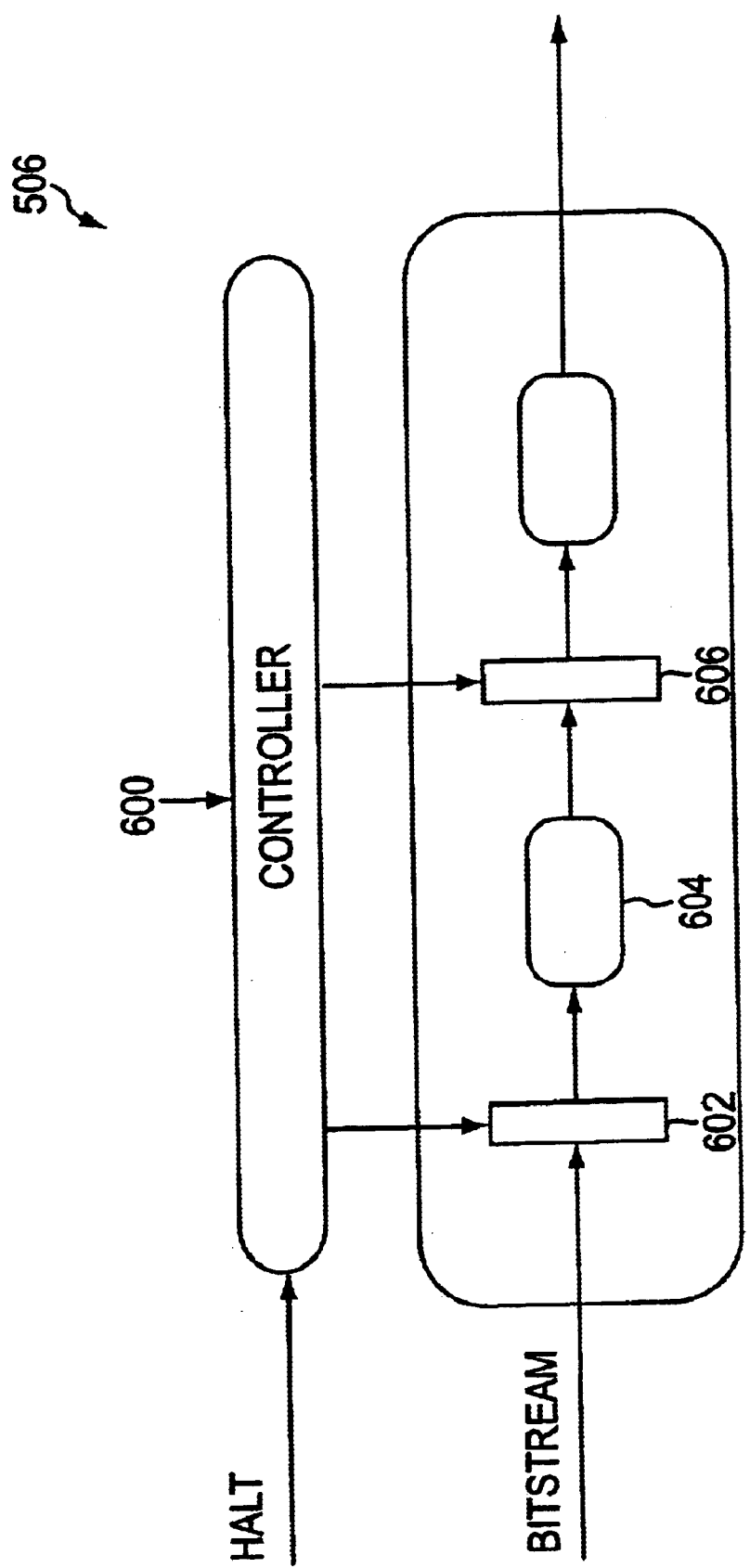
FIG. 6 is a block diagram showing a VLD module in accordance with one aspect of the present invention.

FIG. 6 is a block diagram showing a VLD module 506 in accordance with one aspect of the present invention. VLD module 506 includes a controller 600, an input register 602, VLD logic 604, and an output register 606. The VLD logic 604 includes the computational logic for the VLD module 506. The input register 602 and output register 604 are used to stall execution of the module.

In normal operation bitstream data is input to the VLD logic 604 through the input register 602. The data is then passed on the other modules through the output register 606. Normal operation occurs as long as the controller 600 receives a halt FALSE signal. However, when the controller 600 receives a halt TRUE signal, the controller 600 signals the input register 602 and the output register 606 to freeze at their current state. Thus, the actual state of the VLD module 604 remains fixed whenever halt TRUE signal is sent to the module. These state control mechanisms are also present in the RLD/IZZ and IQ modules.

Thus, referring back to FIG. 5, the VLD 506, RLD/IZZ 508, and IQ 510 all include the state control mechanisms of FIG. 6. Therefore, whenever the IDCT module 514 is ready to write data to the IDCT memory buffer 515 and the MS module 516 is currently reading data from the IDCT memory buffer 515, a halt TRUE signal is sent to the VLD 406, RLD/IZZ 408, and IQ 410 to remain in their current state. In addition, the modules are halted whenever the FIFO controller 405 determines that bitstream data is unavailable for decoding.

As stated previously, the data returned from the output of the VLD 506, RLD/IZZ 508, and IQ 510 modules is input to the IDCT input double buffer 512, and then to the IDCT 514. The output from the IDCT is then combined with the output of the motion compensation 518 to form the reconstructed data. The MS 516 then saves the reconstructed data in the DRAM 520, where it can be accessed by the memory controller 520 for transmission to the display controller 522.

Figure 7:
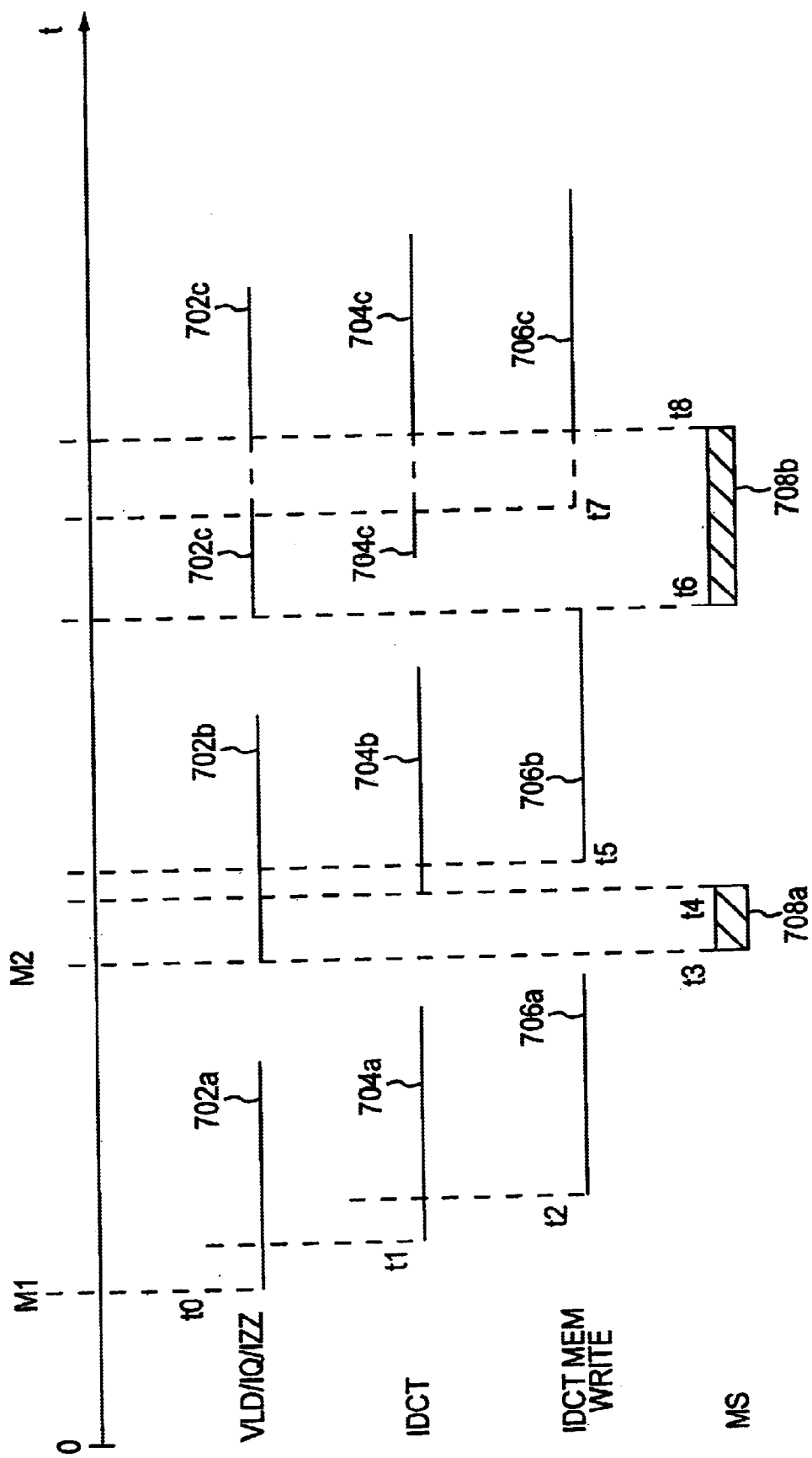
FIG. 7 is an implementation timing diagram for a decompress engine, in accordance with an embodiment of the present invention.

FIG. 7 is an implementation timing diagram 700 for a decompress engine, in accordance with an embodiment of the present invention. The implementation timing diagram includes a VLD/IQ/IZZ operational period 702a, an IDCT operational period 704a, an IDCT memory store operational period 706a, and an MS operational period 708a.

Generally, the VLD/IQ/IZZ 702a modules are started. After certain cycles the VLD/IQ/IZZ 702a generates a data block, which is stored in a double buffer. Then, once the double buffer has a block of data from the VLD/IQ/IZZ 702a, the IDCT 704a is started, at time t1. After an additional cycle the IDCT 704a generates a block of data, which is stored to the IDCT memory buffer 706a, at time t2. Then, after all the IDCT data has been written to the IDCT memory, the MS 708a starts reading the IDCT memory, at time t3. The MS 708a reads the IDCT and MC data, adds them together, and stores the results in the result in the DRAM. Also, at time t3, the process is started again.

The critical issue is the relationship between the IDCT and the MS. The IDCT uses a coded block pattern (CBP) for memory storage. Thus, the configuration of the data in memory is unknown until the bitstream is decoded. The MS, on the other hand, reads data sequentially. Hence, conflicts may occur if the MS and IDCT share the IDCT memory at the same time since the IDCT may over write data that the MS is attempting to read.

To avoid these conflicts, the present invention determines whether the MS module is finished reading data from the IDCT memory buffer before allowing the IDCT module to write to the IDCT memory buffer. As shown in FIG. 7, the present invention starts the VLD/IQ/IZZ modules 708b simultaneously with the MS module 708a. Then, when the IDCT 704b is ready to write to the IDCT memory buffer 706b, the MS module is checked to determine whether it is finished reading data from the IDCT memory buffer. If the MS is finished reading data from the IDCT memory buffer, the IDCT is allowed to write to the IDCT memory buffer. For example, at time t5, the beginning of the second IDCT memory buffer write operation 706b, the MS 708a is checked to determine whether it has finished reading data from the IDCT memory buffer. In this case, the MS 708a completed reading data from the IDCT memory buffer at time t4, which is before time t5, so the IDCT is allowed to write to the IDCT memory buffer.

However, if the MS is still reading data from the IDCT memory buffer at the time the IDCT is ready to write the IDCT memory buffer, the operations of the VLD/IQ/IZZ, IDCT, and IDCT memory buffer write operations are halted until the MS has finished reading from the IDCT memory buffer. For example, during the third microblock of FIG. 7, the VLD/IQ/IZZ 702c modules are started simultaneously with the MS, at time t6. Then, at time t7, the beginning of the third IDCT memory buffer write operation 706c, the MS 708b is checked to determine whether it has finished reading data from the IDCT memory buffer. In this case, the MS 708b has not yet finished reading the IDCT memory buffer, thus the operations of the VLD/IQ/IZZ 702c, IDCT 704c, and IDCT memory buffer write 706c operations are halted, at time t7. Then, at time t8, the MS finishes reading the IDCT memory buffer, and the VLD/IQ/IZZ 702c, IDCT 704c, and IDCT memory buffer write 706c operations are started again.

Conventional decoders delay the start of the next VLD/IQ/IZZ 302b operational period until after the MS operational period 308a is over. In this manner, a buffer of time Δt is created between the time the MS 308a is finished reading the IDCT memory, and the time the IDCT writes to the IDCT memory 306a. This buffer ensures no memory conflicts will occur in the IDCT memory during a conventional decoding process.

However, the time used to create the buffer Δt is wasted since the MS and IDCT memory are idle during this period. Ideally, the IDCT memory would be active during this time receiving data from the IDCT. However, since the MS must access the DRAM, the MS operational period 308a is uncertain, as shown in FIG. 3 with reference to MS operational period 308a, and MS operational period 308b. Thus, prior art decompression engines generally must use a time buffer Δt to avoid memory conflicts between the IDCT and MS.

The present invention, instead of leaving a time buffer Δt for the MS to perform its function, uses the controllers 506 to determine whether the MS actually needs extra time to finish its operation. The time during which the MS operates is not wasted because the VLD/IQ/IZZ and the IDCT are permitted to operate during that time—the VLD/IQ/IZZ operation 702b begins as soon as the MS operation 708a does. While this ordinarily poses the risk of memory conflicts in the IDCT memory when the MS operation time 708b is longer than the interval between t6 and t7, the controllers 506 prevent this by holding up the operation of the VLD/IQ/IZZ, the IDCT, and the IDCT memory until the MS has completed its operation.

Figure 8:
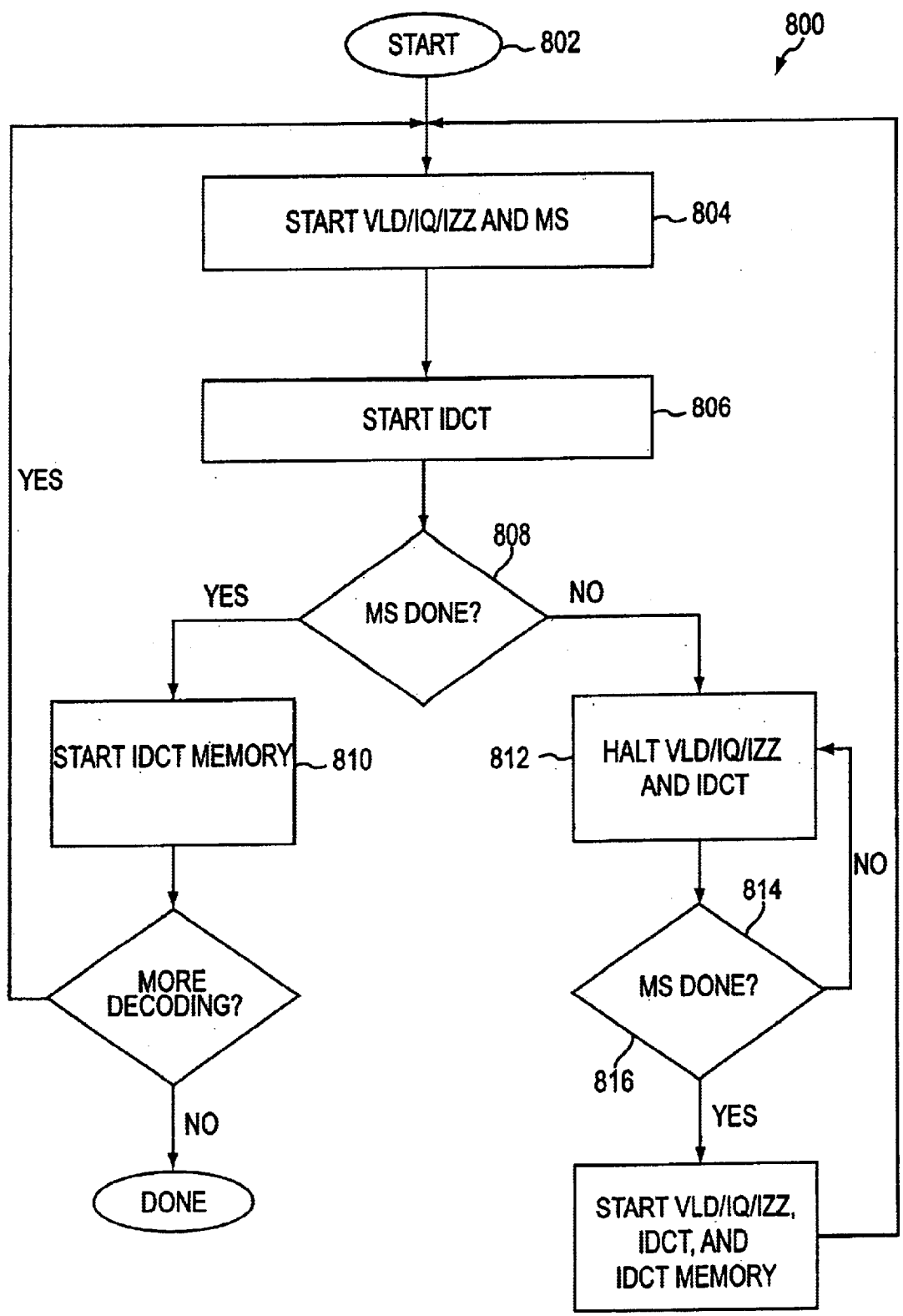
FIG. 8 is a flowchart showing a process for decoding an interruptible bitstream, in accordance with one embodiment of the present invention.

Turning next to FIG. 8, a process 800 is shown for decoding an interruptible bitstream, in accordance with one embodiment of the present invention. The process starts with an initial operation 802, wherein pre-process operations are performed. Pre-process operations include temporarily storing the incoming bitstream data into the DRAM and other pre-process operation that will be apparent to those skilled in the art.

In normal operation bitstream data is input to the operational logic of the module through the input register. The bitstream is then passed on to the other modules through the output register. Normal operation comprising the steps 804, 806, and 810 occurs as long as the controller receives a data valid TRUE signal 808. However, when the MS is not done, the controller receives a data valid FALSE signal, and the controller signals the input register and the output register to freeze at their current state 812. Thus, the actual state of each module remains fixed whenever data valid FALSE signal is sent to the module. These state control mechanisms are preferably present in all the decoding modules.

Once decoding operations have been halted, the process continues with another bitstream availability operation 814. In this manner, the system continues to hold in its present state until receiving a data valid TRUE signal, at which point the process continues by decoding the bitstream data, in a decoding operation 816.

While the present invention has been described in terms of several preferred embodiments, there are many alterations, permutations, and equivalents which may fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for dynamic pipelining of an incoming compressed bitstream, the method comprising the operations of:

decoding a portion of an incoming bitstream, wherein uncompressed video data is generated;

determining whether a memory operation is complete, wherein the memory operation includes storing the uncompressed video data to memory;

halting the decoding of the incoming bitstream during a specific time period, the specific time period including a time period wherein the memory operation is incomplete; and restarting the decoding of the incoming bitstream when the memory operation is complete.

2. A method as recited in claim 1, wherein the decoding of the incoming compressed bitstream includes performing an inverse discrete cosine transformation (IDCT) operation.

3. A method as recited in claim 2, wherein the specific time period begins when an IDCT module finishes writing to memory for a particular cycle.

4. A method as recited in claim 1, wherein halting the decoding of the incoming bitstream includes providing a halt command to a register controller, wherein the register controller is in communication with an input register and an output register, wherein decoding logic receives data input from the input register and provides data output to the output register.

5. A method as recited in claim 4, further comprising the operation of providing a latch command to the input register and the output register when the register controller receives the halt command.

6. A method as recited in claim 5, further comprising the operation of latching data stored in the input register and the output register when the latch command is received by the input register and the output register.

7. A method as recited in claim 1, wherein the memory operation includes a merge and store operation.

8. A decoder for providing dynamic pipelining of an incoming compressed bitstream, the decoder comprising:

decoding logic modules, the decoding logic modules capable of decoding an incoming compressed bitstream;

memory storing logic in communication with at least one of the decoding modules, the memory storing logic capable of determining whether a memory operation is complete, wherein the memory operation includes storing the uncompressed video data to memory;

halting logic in communication with the decoding logic and the memory storing logic, the halting logic capable of halting the decoding of the incoming bitstream during a specific time period, the specific time period including a time period wherein the memory operation is incomplete; and initiating logic in communication with the decoding logic and the memory storing logic, the initiating logic capable of restarting the decoding of the incoming bitstream when the memory operation is complete.

9. A decoder as recited in claim 8, wherein the decoding logic modules include an inverse discrete cosine transformation (IDCT) module.

10. A decoder as recited in claim 9, wherein the specific time period begins when the IDCT module finishes writing to memory for a particular cycle.

11. A decoder as recited in claim 8, wherein the halting logic includes command logic that provides a halt command to a register controller, wherein the register controller is in communication with an input register and an output register, wherein decoding logic receives data input from the input register and provides data output to the output register.

12. A decoder as recited in claim 11, further comprising latching logic that provides a latch command to the input register and the output register when the register controller receives the halt command.

13. A decoder as recited in claim 12, further comprising a latch that latches data stored in the input register and the output register when the latch command is received by the input register and the output register.

14. A decoder as recited in claim 8, wherein the memory storing logic includes a merge and store module.

15. An application specific integrated circuit (ASIC) having a decoder for providing dynamic pipelining of an incoming compressed bitstream, the ASIC comprising:

a memory controller;

decoding logic modules, the decoding logic modules capable of decoding an incoming compressed bitstream;

memory storing logic in communication with at least one of the decoding modules, the memory storing logic capable of determining whether a memory operation is complete, wherein the memory operation includes storing the uncompressed video data to memory;

halting logic in communication with the decoding logic and the memory storing logic, the halting logic capable of halting the decoding of the incoming bitstream during a specific time period, the specific time period including a time period wherein the memory operation is incomplete; and initiating logic in communication with the decoding logic and the memory storing logic, the initiating logic capable of restarting the decoding of the incoming bitstream when the memory operation is complete.

16. An ASIC as recited in claim 15, wherein the decoding logic modules include an inverse discrete cosine transformation (IDCT) module.

17. An ASIC as recited in claim 16, wherein the specific time period begins when the IDCT module finishes writing to memory for a particular cycle.

18. An ASIC as recited in claim 15, wherein the halting logic includes command logic that provides a halt command to a register controller, wherein the register controller is in communication with an input register and an output register, wherein decoding logic receives data input from the input register and provides data output to the output register.

19. An ASIC as recited in claim 18, further comprising latching logic that provides a latch command to the input register and the output register when the register controller receives the halt command.

20. An ASIC as recited in claim 19, further comprising a latch that latches data stored in the input register and the output register when the latch command is received by the input register and the output register.

* * * * *